United States Patent
Chang et al.

(10) Patent No.: US 8,489,465 B2
(45) Date of Patent: *Jul. 16, 2013

(54) TIER-BASED DYNAMIC INCENTIVE ARBITRATION IN AN ON-DEMAND COMPUTING ENVIRONMENT

(75) Inventors: Kyusun Chang, Austin, TX (US); Jagadish Dasari, Austin, TX (US); John Anthony Falkl, Brewster, NY (US); Alfredo V Mendoza, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/462,515

(22) Filed: May 2, 2012

(65) Prior Publication Data

US 2012/0215587 A1    Aug. 23, 2012

Related U.S. Application Data

(63) Continuation of application No. 12/146,061, filed on Jun. 25, 2008, now Pat. No. 8,249,937, which is a continuation of application No. 10/922,275, filed on Aug. 19, 2004, now Pat. No. 7,421,402.

(51) Int. Cl.
   *G06Q 30/00* (2012.01)

(52) U.S. Cl.
   USPC ........................................ 705/26.1; 705/27.1

(58) Field of Classification Search
   USPC ................................. 705/26.1, 27.1
   See application file for complete search history.

(56) References Cited

U.S. PATENT DOCUMENTS

| | | | |
|---|---|---|---|
| 5,848,139 A | 12/1998 | Grover | |
| 6,078,651 A | 6/2000 | Hartog | |
| 6,347,224 B1 | 2/2002 | Smyth et al. | |
| 6,546,374 B1 | 4/2003 | Esposito et al. | |
| 6,587,838 B1 | 7/2003 | Esposito et al. | |
| 7,421,402 B2 | 9/2008 | Chang et al. | |
| 2004/0111308 A1* | 6/2004 | Yakov | 705/8 |
| 2004/0133506 A1 | 7/2004 | Glodjo et al. | |
| 2006/0069621 A1 | 3/2006 | Chang et al. | |
| 2006/0167703 A1 | 7/2006 | Yakov | |
| 2008/0255953 A1 | 10/2008 | Chang et al. | |

OTHER PUBLICATIONS

On-demand Computing, submitted by applicant on Oct. 27, 2011 in U.S. Appl. No. 12/146,061, now US 8249937, downloaded from the Internet on Jun. 24, 2004, 3 pages.*

(Continued)

*Primary Examiner* — James Zurita
(74) *Attorney, Agent, or Firm* — Robert H. Frantz; David A. Mims, Jr.; Arthur J. Samodovitz

(57) ABSTRACT

A system for allocating resources which are anticipated to be available in an on-demand computing at some time in the future, wherein a producer trending agent (PTA) lists resources according to a trend prediction of resource availability in the past, a consumer trending agent (CTA) places bids for listed resources according to previous resource usage trends, and an arbitration system (REAS) matches the bids with the listings to determine if a match exists. If so, a binding contract for consumption of the matched listed resources is established. The PTA also produce tier-based dynamic incentive (TDI) schema which divides potential bidders into tiers, and offers additional resource incentives according to the tiers. Both PTA and CTA dynamically update their available/usage trends, listings and bids, over time.

36 Claims, 8 Drawing Sheets

OTHER PUBLICATIONS

Four strategies, Koch, Christopher. CIO14. 1 (Oct 1, 2000): 116-128, downloaded from ProQuestDirect on the Internet on Dec. 1, 2012, 5 pages.*

Foster, Ian, The Grid: Computing without Bounds, Scientific America, Apr. 2003, vol. 288 Issue 4, p. 78, 8p, 1 chart, 1c, downloaded from ProQuest on the Internet on Mar. 16, 2008.

"Utility Computing" by seachSmallBizIT.com Definitions downloaded from SearchSmallBizIt.com on Jun. 23, 2004.

"On-Demand Computing" by searchCIO.com Definitions, downloaded from http://searchcio.techtarget.com/sDefinition on Jun. 23, 2004.

"Data Center" by searchDatabase.com Definitions downloaded from http://searchdatabase.techtarget.com/sDefinition on Jun. 23, 2004.

USPTO; examination correspondence from related U.S. Appl. No. 12/146,061, filed on Jun. 25, 2008, by Kyuson Chang, et al.

USPTO; examination correspondence from related U.S. Appl. No. 10/922,275, filed on Aug. 19, 2004, by Kyuson Chang, et al.

Sridhar, T.; "Cloud Computing—A Primer", Part 1: Models and Technologies, from the Internet Protocol Journal, Sep. 2009.

Laird, P.; "Cloud Language: The Taxonomy of On-Demand Computing", retrieved on Feb. 21, 2013 from http://www.interop.com/newyork/2008/presentations/conference/cl11-laird.pdf.

Mell, P., et al.; "The NIST Definition of Cloud Computing—Recommendations of the National Institute of Standards and Technology", NIST special publication 800-145.

* cited by examiner

TIER-BASED DYNAMIC INCENTIVE ARBITRATION IN AN ON-DEMAND COMPUTING ENVIRONMENT

CROSS-REFERENCE TO RELATED APPLICATIONS (CLAIMING BENEFIT UNDER 35 U.S.C. 120)

This application is a continuation of U.S. patent application Ser. No. 12/146,061, which was filed on Jun. 25, 2008, which was a continuation of U.S. patent application Ser. No. 10/922,275, filed on Aug. 19, 2004, by Kyunsun Chang, et al, now U.S. Pat. No. 7,421,402.

CROSS-REFERENCE TO RELATED APPLICATIONS

None.

FEDERALLY SPONSORED RESEARCH AND DEVELOPMENT STATEMENT

This invention was not developed in conjunction with any Federally-sponsored contract.

MICROFICHE APPENDIX

Not applicable,

INCORPORATION BY REFERENCE

None.

BACKGROUND OF THE INVENTION

1. Field of the Invention

This application is a continuation of U.S. patent application Ser. No. 12/146,061, which was filed on Jun. 25, 2008, which was a continuation of U.S. patent application Ser. No. 10/922,275, filed on Aug. 19, 2004, by Kyunsun Chang, et al, now U.S. Pat. No. 7,421,402. This invention relates to surplus or excess resource management, allocation and arbitration in on-demand computing environments such a in utility computing, data center, and grid computing environments.

2. Background of the Invention

As business demand increases, the depth of technology improvements and its intelligence to handle multiple processes becomes highly desirable and crucial. In any enterprise operations, it is difficult to manage effectively the ever-fluctuating resources available white maximizing the resource utilization. Because an enterprise's demand on computing resources can vary drastically from one time to another, it is challenging to maintain a cost-effective balance in resource allocation to meet various scenarios. In fact, Infrastructure Technology ("IT") costs can become very expensive when maintaining sufficient resources to meet peak requirements. On the other hand, if enterprise reduces costs by maintaining minimal computing resources, there will be insufficient resources accessible to meet peak requirements.

Because of this dilemma, the On-Demand ("OD") Computing enterprise model was developed to solve this problem. This model allows computing resources to be made available to the user on an as-needed basis. The resources may be housed within the enterprise or handled by a third party service provider. Major IT vendors in the marketplace such as IBM, Microsoft, HP and Sun Microsystems are developing OD Computing products to help companies to respond to the dynamic business environments at a faster pace. In addition, other new IT concepts such as grid computing and utility computing emerged under this broad category.

Utility computing is an on-demand approach that combines outsourced computing resources and infrastructure management with a usage-based payment structure. It is a service-provisioning model that allows service providers to make resources available to customers as needed then charges usage costs rather than the typical flat rate. The utility model aims to maximize the efficient use of resources while using metered services to minimize the associated costs.

These computing resources are normally organized into data centers. A data center is a centralized repository for the storage, management, and dissemination of data and information organized around a particular area or body of knowledge. For example, the National Climatic Data Center ("NCDC") maintains the world's largest archive of weather information. Website visitors can request weather related questions to the NCDC for response.

A data center can also be a highly specialized facility that houses various websites and provides data serving and other services for other companies. This kind of data center may contain a network operations center ("NOC"), which is a restricted access area containing automated systems that constantly monitor server activity, web traffic, and network performance. In fact, problem reports can be generated to IT staffs to bring awareness for potential problems even before they occur. Within a company, a data center can describe the central data processing facility or the group of people who manages the company's data processing and networks.

Similarly, grid computing is an emerging technology that utilizes a collection of systems and resources to deliver qualities of services. It is distributed computing at its best, by creating a virtual self-managing computer, the processing for which is handled by a collection of interconnected heterogeneous systems sharing different combinations of resources. In simple terms, grid computing is about getting computers to work together, and allowing businesses, or grid participants, to optimize available resources.

The framework to grid computing is large-scale resource sharing, which exists within multiple management domains, typically involving highly parallel applications connected together through a communications medium, and organized to perform one or more requested jobs simultaneously. Each grid resource's characteristics can include, but are not limited, to processing speed, storage capability, licensing rights, and types of applications available.

Grid computing's architecture is defined in the Open Grid Services Architecture ("OGSA"), which includes a basic specification Open Grid Services Infrastructure ("OGSI").

Using grid computing to handle computing jobs of all sizes, and especially larger jobs such as enterprise processes, has several advantages. First, it exploits underutilized resources on the grid. For example, if a financial services company suddenly encounters a 50% increase in stock trade transactions during a 30-minute time period, using a traditional systems process, the company would face an increase in network traffic, latent response and completion time, bottleneck in processing and even overload on its resources due to its limited or fixed computational and communications resources.

In a similar situation, however, grid computing can adjust dynamically to meet the changing business needs, and respond instantly to stock transaction increase using its network of unused resources. For example, a grid computing system could run an existing stock trading application on four underutilized machines to process transactions, and deliver results four times faster than the traditional computing architecture. Thus, grid computing provides a better balance in resource utilization and enables the potential for massive parallel CPU capacity.

In addition, because of its standards, grid computing enables and simplifies collaboration among many resources and organizations from a variety of vendors and operators. Grid computing provides sharing capabilities that extends to additional equipment, software, services, licenses and others. Furthermore, the grid can offer more advanced resource load balancing. A relatively idle machine may receive an unexpected peak job, or if the grid is fully utilized, priorities may be assigned to better execute the number of requested jobs. By using a Grid Management System ("GMS") scheduler, a grid can provides excellent infrastructure for brokering resources.

Within a Grid or other on-demand computing environment, there will almost always be pools of some free resources. CPU and disk storage are examples of resources that can be free or idle at any point in time. "Resource providers", also known as producers, own these free resources, while the companies that require CPU and disk storage to run its IT needs are the "consumers" within the grid or on-demand environment. By agreement on value, consumers sign a contract with resource providers to consume a predetermined amount of guaranteed resources allocated for an agreed price for set amount of time. Consumers are responsible for actual usage and any additional resource require will be have its extra costs levied once the consumer exceeds its previously set capacity.

Although both grid and utility computing provide a better method for consumers to access and collaborate resources on an as-needed basis, it does not create a demand environment that promotes to consumers the number of available resources. Typically, excess capacity remains idle until a consumer initiates an order for more resource requirement. In addition, because service providers are deficient in marketing unused resources, there also lacks a definitive "value" on the underutilized resources.

Therefore, there exists a need in the art of a systematic approach to create a marketplace that facilitates the demand for excess unused resource capacity. In addition, there exists a need in the art of creating "worth" or "value" for available resources in order for respective parties to enter into contractual agreements for goods and services exchanged. Furthermore, there exists a need in the art of optimizing available resources to allow usage at its optimum capacity at any given time.

BRIEF DESCRIPTION OF THE DRAWINGS

The following detailed description when taken in conjunction with the figures presented herein present a complete description of the present invention.

SUMMARY OF THE INVENTION

Figure 1:
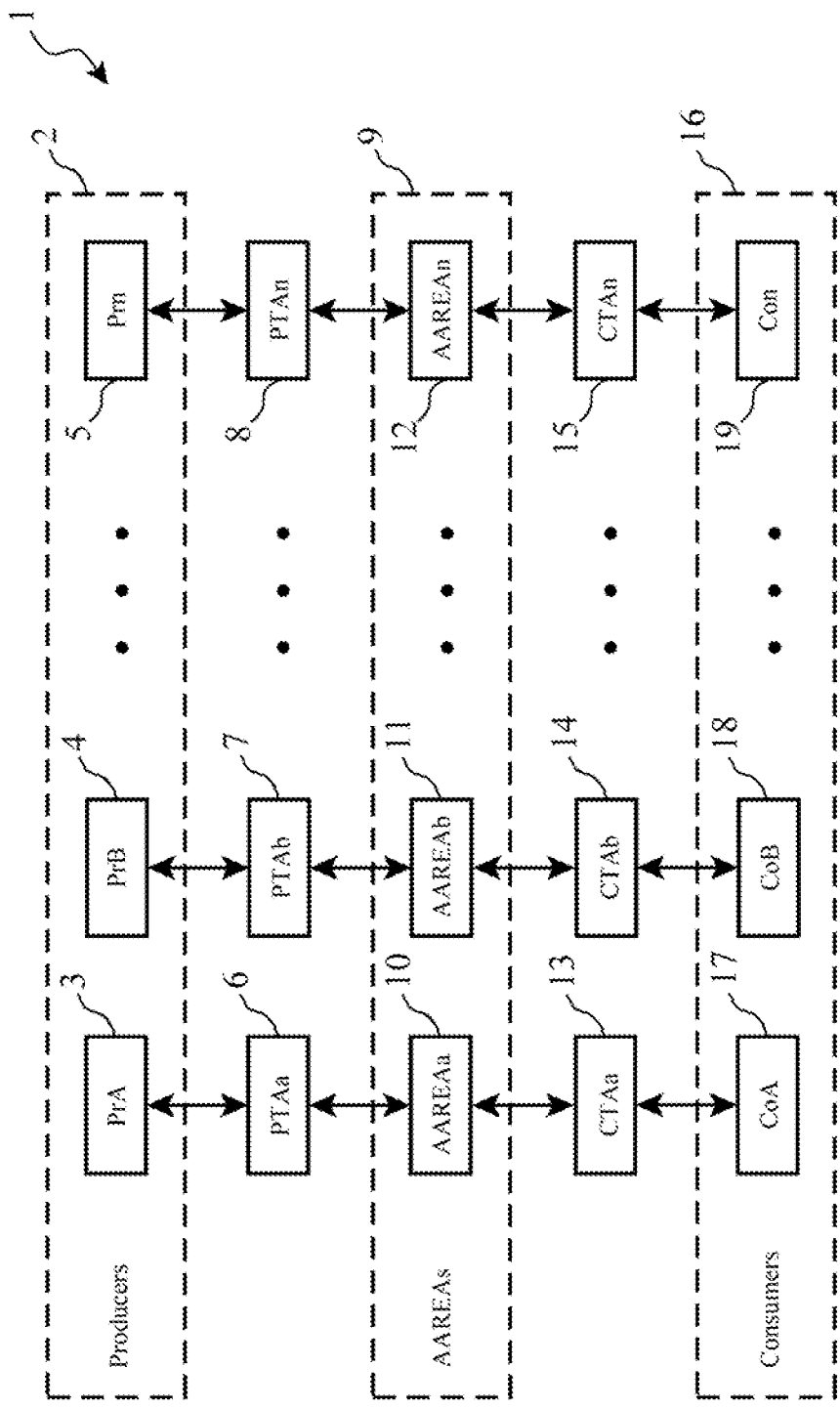
FIG. 1 describes the fundamental architecture of the present invention.

The present invention enables service providers to market unused idle resources to consumers. The invention provides a method to allow both consumers and service providers to exchange listed goods and services for an agreed price using the proposed Agent-Based Resource Entitlement Arbitration System ("AAREAS"). This allows all available resources to be utilized at its optimum usage. In addition, consumers have the opportunity to make offers on available resources, which can result in dramatic IT cost savings.

According to one aspect of the present invention, a Tiered-Based Dynamic Incentive Arbitrator is introduced to provide resource valuation at its best within the auction system. By using this combination, producers and consumers will be able to exchange goods and services within a competitive dynamic environment with quicker negotiation response time.

As such, the invention enables the consumers to fully purchase any unused resources from service providers which results in higher resource utilization and IT cost savings for consumers under an auction setting.

DETAILED DESCRIPTION OF THE INVENTION

The present invention is preferably realized in conjunction with an on-demand computing technology or architecture, such as a grid computing environment. As the present invention's benefits are not limited to grid computing environment alone, it will be recognized by those skilled in the art that our disclosure of specific implementation details with respect to grid environments does not limit the scope of the invention to such. It is within the skill of those in the art to adapt and configure the present invention for use with other on-demand computing technologies, including but not limited to data centers and utility computing.

The following definitions will be employed throughout this disclosure:

(a) "Grid environment" and "on-demand computing environment" shall mean a collection of computing resources such as servers, processors, storage systems, and communications media, ranging from just a few machines to groups of machines organized as a hierarchy potentially spanning the world;

(b) "Job" shall mean a desired requested task that a client initiates to be processed using available and selected resources;

(c) "Resources" shall mean any system, hardware or software module that is available for use in completing a job, such as application programs, hardware, software licenses, storage and related components;

(d) "Metered services" (also called pay-per-use) shall mean any type of payment structure in which a customer has access to potentially unlimited resources but only pays for what they actually use.

(e) "Bid" shall mean an offer of value for exchange of goods or services;

(f) "Marketplace" shall mean a forum compose of producers and consumers and its representing agents for exchange of goods and services;

(g) "Reserve Price" shall mean the minimum price a producer is willing to accept for a listed resource;

(h) "Winning Bidder" shall mean a bidder who has met or exceeded the reserve price and has the highest bid in an auction;

(i) "Auction" shall mean a sale in which goods or services are exchanged between participants to the highest bidder; and (j) "Value" shall mean an amount considered to be a fair and suitable equivalent for exchange of goods and services between parties.

Computing Platform Suitable for Realization of the Invention

The invention, in one available embodiment, is realized as a feature or addition to software products, such as IBM's grid computing products, for execution by well-known computing platforms such as personal computers, web servers, and web browsers.

As the computing power, memory and storage, and communications capabilities of even portable and handheld devices such as personal digital assistants ("PDA"), web-enabled wireless telephones, and other types of personal information management ("PIM") devices, steadily increases over time, it is possible that the invention may be realized in software for some of these devices, as well.

Therefore, it is useful to review a generalized architecture of a computing platform which may span the range of implementation, from a high-end web or enterprise server platform, to a personal computer, to a portable PDA or web-enabled wireless phone.

Figure 7:
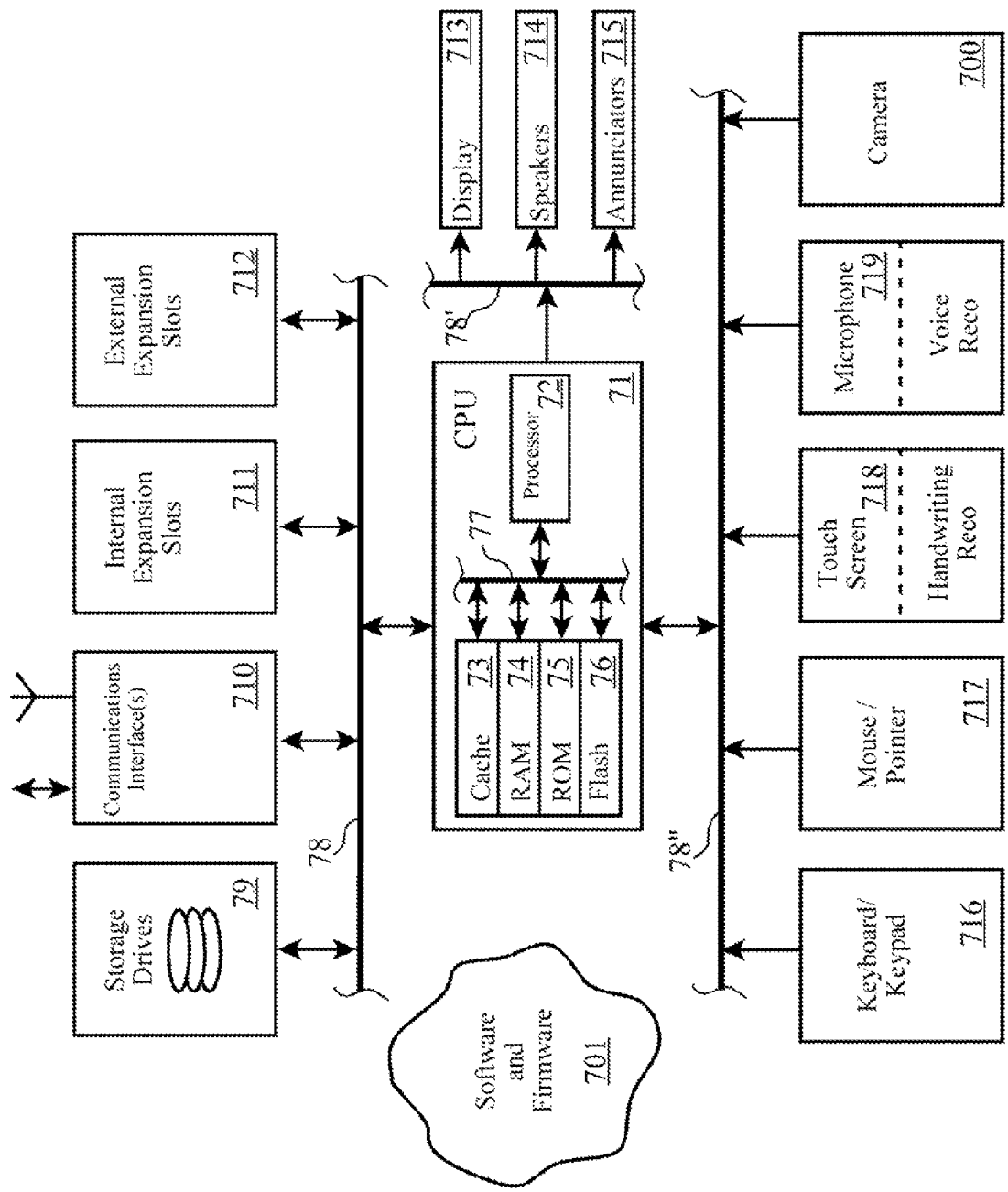
FIG. 7 depicts a generalized computing platform, suitable for implementation of the invention according to one available embodiment.

Turning to FIG. 7, a generalized architecture is presented including a central processing unit (71) ("CPU"), which is typically comprised of a microprocessor (72) associated with computer-readable storage devices. Often, the CPU (71) is provided with computer-readable storage devices such as random access memory ("RAM") (74), read-only memory ("ROM") (75), cache memory (73) and programmable FlashROM (76). The interface (77) between the microprocessor (72) and the various types of CPU memory is often referred to as a "local bus", but also may be a more generic or industry standard bus. The term "computer-readable storage device" does not encompass a signal propagation media such as a copper cable, optical fiber or wireless transmission media.

Many computing platforms are also provided with one or more storage drives (79), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (710), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (811), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (712) allowing the user the ability to easily install and remove hardware expansion devices, such as PCMCIA cards, SmartMedia cards, and various proprietary modules such as removable hard drives, CD drives, and floppy drives.

Often, the storage drives (79), communication interfaces (810), internal expansion slots (711) and external expansion slots (712) are interconnected with the CPU (71) via a standard or industry open bus architecture (78), such as ISA, EISA, or PCI. In many cases, the bus (78) may be of a proprietary design.

A computing platform is usually provided with one or more user input devices, such as a keyboard or a keypad (716), and mouse or pointer device (717), and/or a touch-screen display (718). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (718) is usually provided, often with handwriting recognition capabilities.

Additionally, a microphone (719), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (7100), such as a still digital camera or full motion video digital camera.

One or more user output devices, such as a display (713), are also provided with most computing platforms. The display (713) may take many forms, including a Cathode Ray Tube ("CRT"), a Thin Flat Transistor ("TFT") array, or a simple set of light emitting diodes ("LED") or liquid crystal display ("LCD") indicators.

One or more speakers (714) and/or annunciators (715) are often associated with computing platforms, too. The speakers (714) may be used to reproduce audio and music, such as the speaker of a wireless telephone or the speakers of a personal computer. Annunciators (715) may take the form of simple beep emitters or buzzers, commonly found on certain devices such as PDAs and PIMs.

These user input and output devices may be directly interconnected (78', 78") to the CPU (71) via a proprietary bus structure and/or interfaces, or they may be interconnected through one or more industry open buses such as ISA, EISA, PCI, etc. The computing platform is also provided with one or more software and firmware (7101) programs to implement the desired functionality of the computing platforms.

Figure 8:
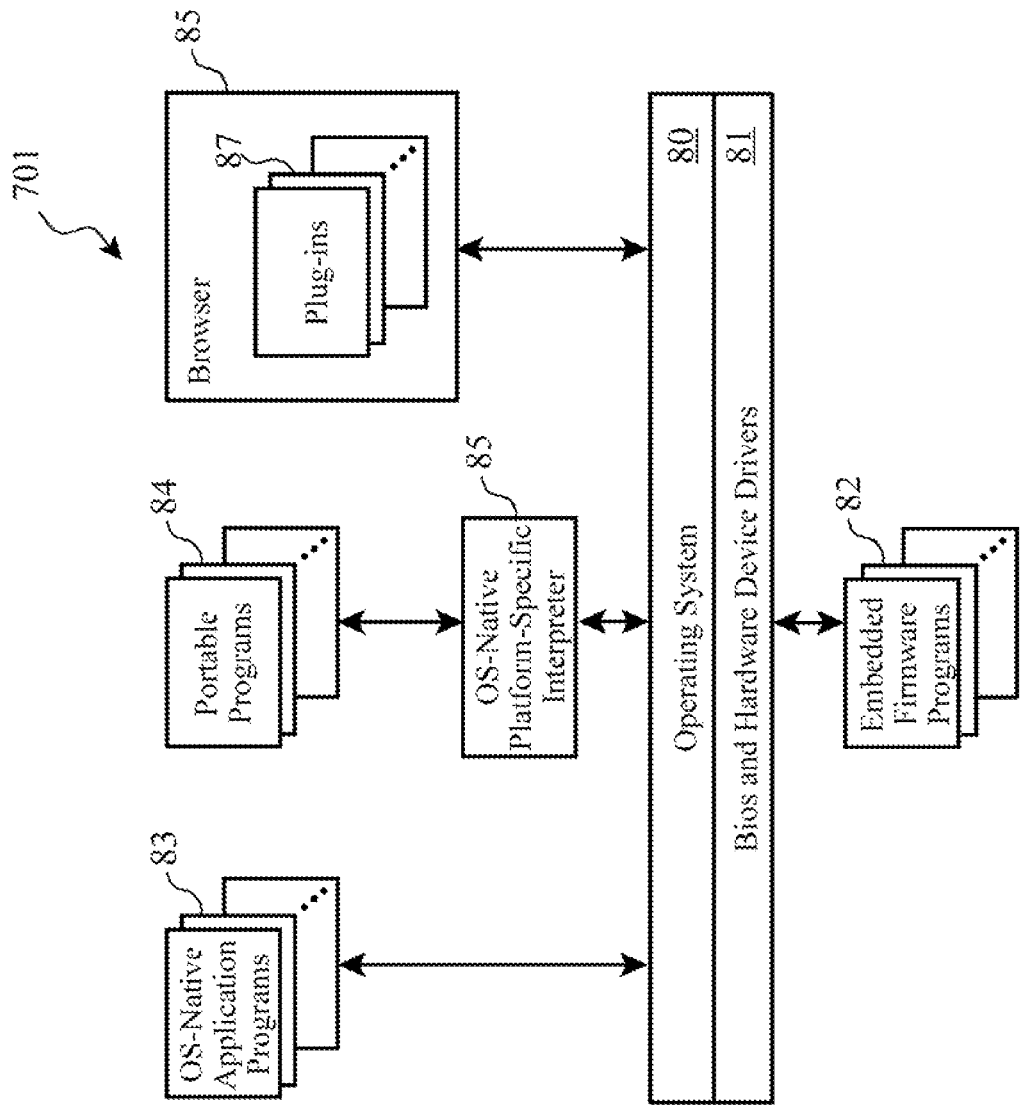
FIG. 8 provides more details of the software organization of the platform of FIG. 7.

Turning to now FIG. 8, more detail is given of a generalized organization of software and firmware (7101) on this range of computing platforms. One or more operating system ("OS") native application programs (823) may be provided on the computing platform, such as word processors, spreadsheets, contact management utilities, address book, calendar, email client, presentation, financial and bookkeeping programs.

Additionally, one or more "portable" or device-independent programs (824) may be provided, which must be interpreted by an OS-native platform-specific interpreter (825), such as Java™ scripts and programs.

Often, computing platforms are also provided with a form of web browser or micro-browser (826), which may also include one or more extensions to the browser such as browser plug-ins (827).

The computing device is often provided with an operating system (820), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (821) are often provided to allow the operating system (820) and programs to interface to and control the specific hardware functions provided with the computing platform.

Additionally, one or more embedded firmware programs (822) are commonly provided with many computing platforms, which are executed by onboard or "embedded" microprocessors as part of the peripheral device, such as a micro controller or a hard drive, a communication processor, network interface card, or sound or graphics card.

As such, FIGS. 7 and 8 describe in a general sense the various hardware components, software and firmware programs of a wide variety of computing platforms, including but not limited to personal computers, PDAs, PIMs, web-enabled telephones, and other appliances such as WebTV™ units. It will be readily recognized by those skilled in the art that the methods and processes disclosed herein may be alternatively realized as hardware functions, in part or in whole, without departing from the spirit and scope of the invention.

Suitable On-Demand Computing Environment

As stated in the foregoing paragraphs, the present invention is useful with a wide variety of on-demand computing technologies and architectures. For ease in understanding, our disclosure will focus on implementation with one such architecture offered by International Business Machines ("IBM"). The invention, however, may be realized in conjunction with other types of on-demand computing systems, as well.

Figure 5:
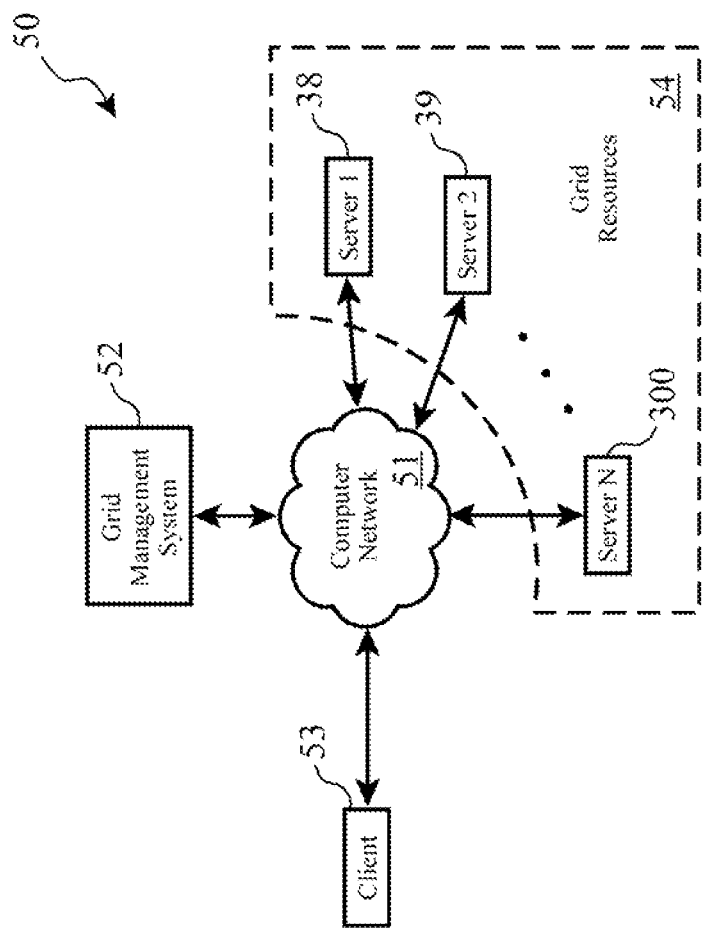
FIG. 5 shows a high-level perspective of grid computing in general.

Turning to FIG. 5, the new computing paradigm of grid computing (50) is illustrated at a high level. A client (53), such as an FBI analyst using a client computer, requests a computational job or task, a cross-agency list of suspected terrorists, to be performed by the grid. The job is submitted via a communications network (51) to a Grid Management System ("GMS"), which makes a selection of which grid vendor(s) (54) to use based on client job criteria (e.g. response time, cost, accuracy, etc.) and resource characteristics, such as server capability, resource availability, storage capacity, and cost.

Once the GMS determines a specific vendor(s) (38, 39, 300) to which the job will be assigned (or among which the job will be divided), requests are sent to the selected grid resources, such as Server 1 (38). Server 1 (38) would then process the job as required, and would return job results, such as a terrorist name list, back to the requesting client (53), such as the FBI analyst, via the communications network (51).

Figure 3:
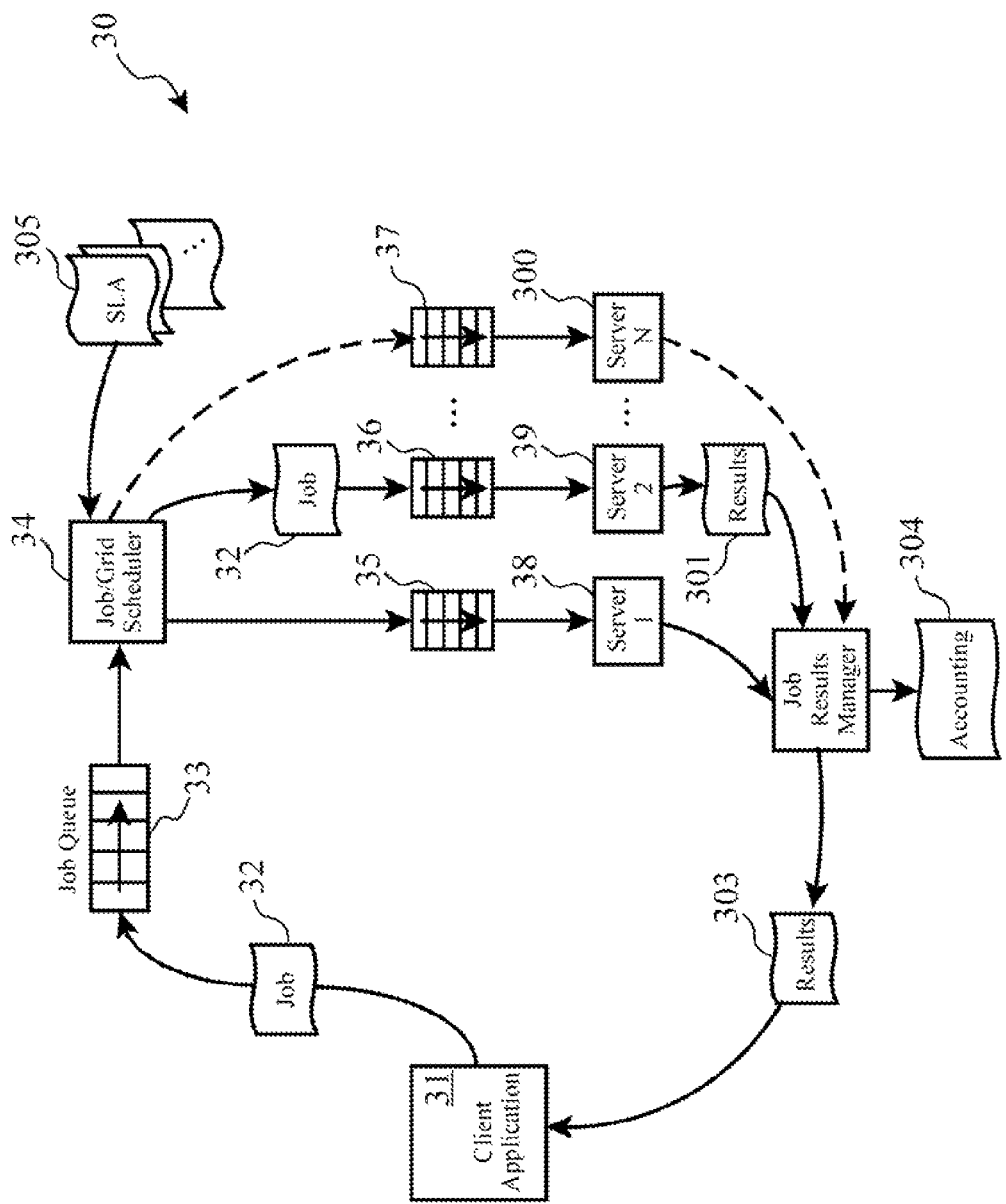
FIG. 3 provides a high-level view of how grid computing functions are accomplished.

FIG. 3 provides a more detailed illustration (30) of how grid computing functions at a lower level. When a job (32) is submitted by a client application (31) to the grid, the job (32) is received into a grid inbound job queue (33), where it awaits assignment to one or more grid resources.

A Job/Grid Scheduler ("JGS") (34) retrieves each pending job from the inbound job queue (33), verifies handling requirements against one or more SLA (305) to determine processing requirements for the job, and then selects winch server or servers (28, 29, 300) to assign to process the job (32). In this illustration, Server 2 (39) has been selected, so the job (32) is transferred to Server 2' job queue (36) to be processed when the server becomes available (immediately if adequate processing bandwidth is already available). Some servers may handle their job queues in an intelligent manner, allowing jobs to have priority designation which allows them to be processed quicker or sooner than earlier-received, lower priority jobs.

Eventually, the assigned server completes the job and returns the results (301) to a Job Results Manager ("JRM") (302). The JRM can verify job completion and results delivery (303) to the client application (31), and can generate job completion records (304) as necessary to achieve billing and invoice functions.

Figure 4:
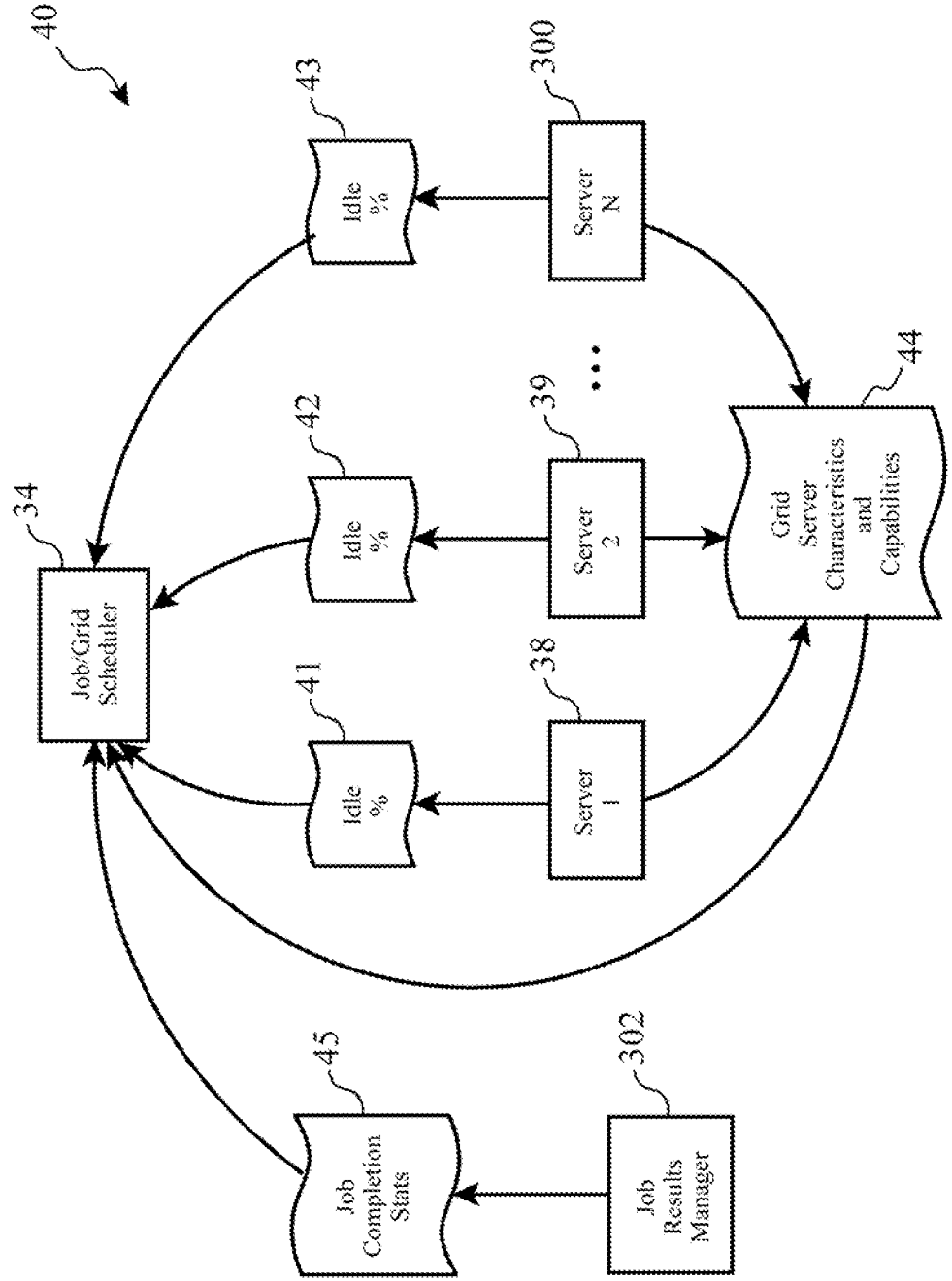
FIG. 4 illustrates the general process for selecting a grid resource.

Turning now to FIG. 4, more details of the resource selection process (40) are shown. Each grid resource (38, 39, 300) may report in real-time its availability or "percent idle" (41, 42, and 43) to the Job/Grid Scheduler (34). Additionally, a set of grid resource characteristics and capabilities (44) is compiled, either statically, dynamically, or both, which is also available for the JGS (34) to use. Some server characteristics may be static, such as hardware characteristics (e.g. installed memory, communications protocols, or licenses), which other characteristics may be more dynamic in nature, such as number of licenses available for a certain application program (e.g. PDF generators, video compressors, etc.). Additionally, the completion statistics (45) from the Job Results Manager (302) are preferably available to the JGS (34), as well.

Through consideration of these factors regarding the grid resources, and in combination with the Service Level Agreement client requirements, the JGS can select one or more appropriate grid resources to which to assign each job. For example, for high-priority jobs that require immediate processing, the JGS may select a resource which is immediately available, and which provides the greatest memory and processing bandwidth. For another job which is cost-sensitive but not time critical, the JGS may select a resource which is least expensive without great concern about the current depth of the queue for handling at that resource.

Agent-Based Resource Entitlement Arbitration System

Currently, customers purchase a predetermined amount of resources with the negotiated pricing structure within certain restrictions such as type of resources, time of usage, amount of usage and method of usage from service providers. These contract negotiations typically require several iterations and considerable effort by both parties.

However, when an unexpected business demand occurs, customers may require additional resource capacity that exceeds its contractual agreement. Thus, a customer's requests for additional resource requirements will yield a higher premium for its service provider. Conversely, if the service providers have unused available resources at any given time, there is no dynamic "marketplace" that allows service providers to notify customers resource availability and allow for bidding to take place. As a result, customers do not have the opportunity to seize business advantage to purchase available resources at a potentially lower price for future usage.

The preferred embodiment of the present invention, which we call an Agent-Based Resource Entitlement Arbitration System ("AAREAS"), is a system that allows consumers to bid on free resources from resource providers that allow the free resources to be used at a lower price point while waiting for a consumer to order for more resources.

The AAREAS allows resource providers to register its available free resources and allow consumers the ability to place bids on resources. Any free resources can be registered in any format such as a catalogue with the necessary detail description information alongside. Features such as CPU resource with a particular Operating System such as AIX, Linux, Windows or UNIX with middleware such as DB2, WebSphere, and Message Queue systems and its time availability will be described. For example, within a catalog entry a resource provider can list a UNIX system with DB2 currently in use today is not scheduled for any work in two days time. Thus, consumers, in return, will be able to place bids on exact or near exact resources that they need based on the information provided.

The AAREAS enables consumers the flexibility to obtain resources at a lower premium rates than the penalty charges consumers pay when they exceed predetermined usage plan. Additionally, resource providers have a more effective method to optimize its resource utilization by allowing free resources to be purchase for a limited time at an accepted bid price for any time frame such as by hour, days or weeks. Furthermore, resource providers have the option to note any restrictions or specifications that may apply on a case-by-case scenario. Consequently, any idle resources will have a greater potential to be fully utilized at any given time using the AAREAS.

Turning to FIG. 1, our architecture (1) is shown which illustrates the logical processes for consumers and resource providers interact for resource exchange (1). Service providers (2) PrA, PrB through Prn (3, 4, 5) all supply their own respective types of resources to the on-demand computing environment.

A set of Producer Trending Agents ("PTA") (6, 7, 8) are provided, which are monitoring systems that work on behalf of each "producer", and which facilitate listing or offering of free resources from those producers (2). A PTA can be programmed to list which free resources can be placed into the AAREAS. Additionally, it can also be programmed to use historical trend data to predict future available pools of resources for use. Each PTA such as PTAa, PTAb, and PTAn manages each resource provider and its available resources.

Each "consumer" or user of services (16) from the on-demand computing architecture, such as consumers CoA, CoB and CoN (17, 18, 19), also has their own monitoring system, called a Consumer Trending Agent ("CTA") (13, 14, 15). The CTAs, such as CTAa, CTAb, CTAn, represent each consumer with its best interest and facilitates the bidding process. Based on consumer preferences, the CTA automatically places bids on offered or listed resources based on recent historical usage data and consumption for the consumer which it represents. The consumer can program the CTA to start bidding at a specific price, optionally with set incremental values and with a limit to the maximum bid price point.

The AAREAS (8) scans a database (not shown) and performs matching between listed resources from the PTAs and requests from CTAs. The AAREAS (8), preferably implemented as middleware (10, 11, 12), attempts to match the exact criterion from both parties (e.g matching listed resources to requested resources).

For example, assume PTAa (6) lists a CPU with DB2 database on computer running AIX operating system is available on day 2 for 6 hours, being provided by producer PrA (3). Further assume that during this period of time, CTAa (13) seeks an available resource to process invoicing job within 72 hours for 6 hours on behalf of consumer CoA (17). The AAREAS (9) middleware AAREAa (10) matches the two-parties requirements (e.g. PrA and CoA), and creates a bidding environment for CTAa (13) to make an offer for PTAa's (6) listed resource.

The bidding process continues until PTAa agrees to a bid price for the specified resource from the bidding agent, in this case CTAa (13). During this process, other participating CTAs (13, 15) are also allowed to bid on the same resources being listed by PTAa (6), and the bidding CTAa (13) may bid on suitable resource which are being offered by other PTAs (7, 8), unfit each resource is consumed or assigned to a consumer according to a mutually-agreeable price and performance criteria. Preferably, the AAREAS (9) notifies all participating PTAs and CTAs of auction results, and each corresponding system releases information to its respective parties.

The AAREAS (9) is preferably composed of more than one entity that can be implemented individually due to geographic locations or due to different AAREAS (10, 11, 12) implementations by different companies, as illustrated. In this arrangement, all the AAREAS middleware modules communicate and cooperate with each other to find the best fit for a specific resource need that a registered consumer is seeking. In an alternate embodiment, the AAREAS middleware may be realized as a centralized service, which can ease implementation and maintenance in some scenarios.

Tier-Based Dynamic Incentive Arbitrator

Although the AAREAS solves the problem for resource utilization to be at its optimal usage, it does not have any price reservation points inherent to it in the preferred embodiment. Through use of the AAREAS alone as thus-far described, any consumers with its CTA can bid for any listed resource using the AAREAS without much prior restriction or limitation.

To provide more value for free resource pools, the preferred embodiment comprises a Tiered-Based Dynamic Incentive Arbitrator ("TBDIA"), which facilitates the resource valuation. This enables the producers to generate a greater return on their offered or listed resources, which encourages the broader use of the AAREAS system.

The "tiering" is based on groups of bidders (e.g. consumers) that can bid by invitation only, or by bidders who can meet the set reserved price as a criterion. Each tier has a lowering trend of reserve pricing until the "no-reserved" price auction scheme is reached. By providing our tiers, bidders are limited to those who can afford the reserved price, such as consumers who urgently need resources but still can make a purchase at a lower price.

The AAREAS matches a CTA's request with a resource's listed criterion. As an incentive for bidding on tiers, the resource producers can grant extra benefits to winning bidders such as granting extra resource usage on future bids. These special incentives may be resources that have atypical configurations or leftover resources. The producers have the flexibility to dynamically offer incentives to be listed on the AAREAS. In addition, the TBDIA limits the number of bidders competing for free resources that otherwise would remain idle.

Figure 2:
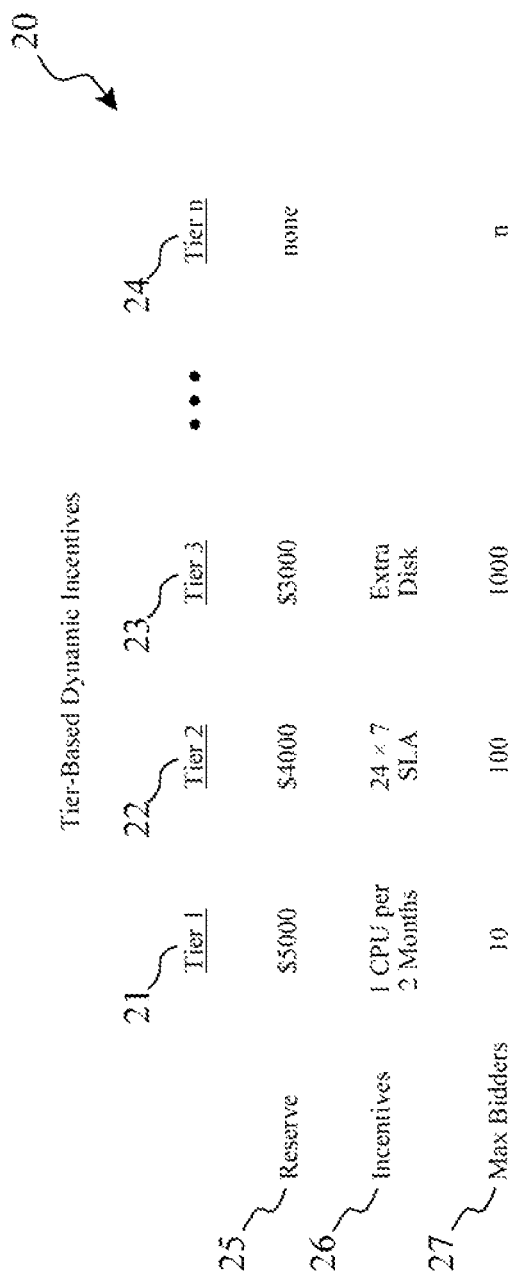
FIG. 2 illustrates the Tier-Based Dynamic Incentive schema employed by our invention.

Turning to FIG. 2, the table illustrates an example of Tier-based Dynamic Incentives schema (20). Under each tier category, such as Tier 1, Tier 2, Tier 3 and Tier n (21, 22, 23, 24, respectively), the auction is limited to those who meet listed requirements such as reserve price (25), incentives (26) and maximum number of bidders (27). In this example, in Tier 3 (23), the minimum or reserve price (25) is set at $3,000 with extra disk storage as its attractive incentive (26), with no more than 1000 bidders allowed within the auction. Therefore, only consumers who have met the reserve price can have the option to participate in the auction, not exceeding 1000 bidding participants. The winner of the auction is also granted the incentive, such as the extra disk storage as shown here.

This achieves two objectives. First, the offerer can provide unused resources as the incentives, thereby enhancing the value to the consumer of the listed resources available for bid. Second, the consumer is encouraged to bid a higher amount for these offered resources as they provide additional value to them, which increases the return to the provider for the listed resources.

Implementation

Figure 6:
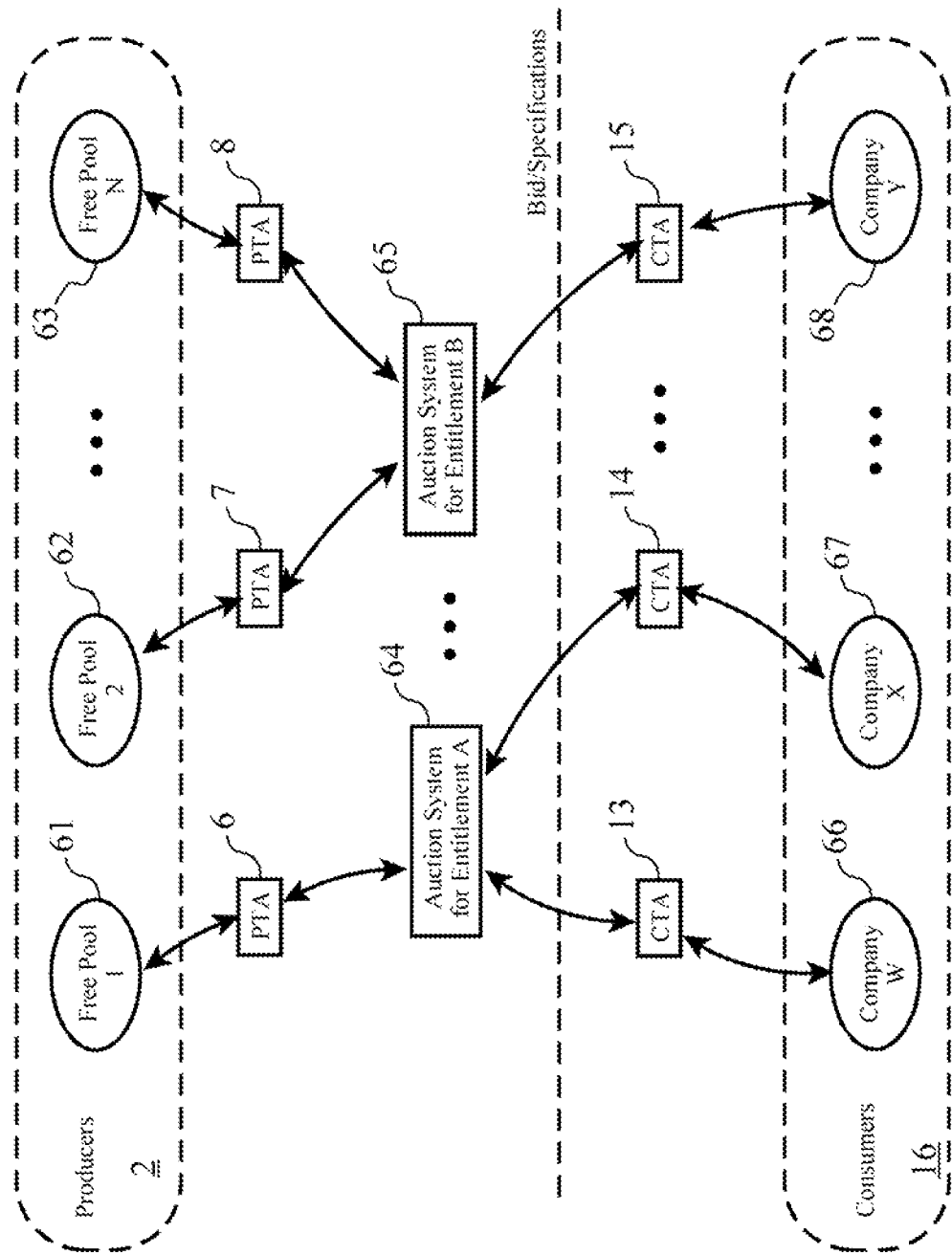
FIG. 6 shows the auction based entitlement system and process of our invention.

The AAREAS is preferably implemented as an auction based entitlement system. The diagram of FIG. 6 shows our auction based entitlement system. The consumers (16) typically include of different companies such as Company W, X and Y (66, 67, 68), or alternatively different departments, different agencies, etc. Each consumer is provide a CTAs (13, 14, 15) that represents the consumer on their behalf with its best interest in the AAREAS.

Each PTA (6, 7, 8) represents a pool of free resources (61, 62, 63) from each resource providers or producers (2), and lists its specific bidding requirements and incentives within the AAREAS. Within each auction system (64, 65), there are provided bid specifications and incentives (64', 65'), including the previously-described TBDIA schema.

The auction systems conduct matches between bids submitted by the CTAs and bid specifications provided by the PTAs until the auctions close (e.g. resources are no longer available) or a winning bidder is determined. The auction system's main goal is to facilitate a seamless match for consumer bids on free resources. Once each auction ends, participating consumers are notified on bid status.

As such, the AAREAS constantly provides a marketplace to meet the dynamic demands from both consumers and producers. The AAREAS is preferably implemented in Java and web services technology which exposes its interface to the CTAs and the PTAs. Several AAREAS middleware modules communicate through web services calls, as well. All communications between PTAs, CTAs and auction system is preferably conducted via a secured protocol, such as Hypertext Transfer Protocol over Secured Socket Layer ("HTTPs") or Simple Object Access Protocol ("SOAP"). HTTPS is a web protocol built into its browser that encrypts and decrypts user page requests as well as pages that are returned by the Web server. SOAP is a method for a program running in one kind of operating system to communicate with another program in the same or another kind of operating system using the Internet as the mechanism for information exchange. SOAP specifies exactly how to encode information so that a program in one computer can call a program in another computer and pass the information. In addition, it stipulates how the called program returns a response as well.

Digital certificates are preferably used as a means of authentication as well as non-repudiation of bids placed. As a preferable restriction, the contracts between the producers and consumers are binding and non-transferable, in order to eliminate bidding to find price points with subsequent non-completion of the contract. This limitation also protects the producers offering their free pools at a lower price from consumers who might resale the purchased free pools of resources to other consumers at a higher price.

Conclusion

The present invention has been described in general terms and by use of illustrative embodiment examples. It is within the skill of those in the art to make certain alterations modifications, such as programming language, computing platforms, implementation methodology, in order to realize an alternative embodiment of the invention for use with an alternative system. Therefore, the scope of the present invention should be determined by the following claims.

What is claimed is:

1. A computer system for allocating available resources in an on-demand computing environment, the computer system comprising:

one or more processors, one or more computer-readable memories, one or more computer-readable storage devices, and program instructions stored on at least one of the one or more storage devices for execution by at least one of the one or more processors via at least one of the one or more memories, the program instructions comprising:

program instructions to predict a future free pool of on-demand computing resources according to trend analysis of past available on-demand computing resources;

program instructions, responsive to receiving a bid for future usage of on-demand computing resources by a consumer computer, to determine that conditions specified in the bid match one of the on-demand computer resources within the predicted free pool; and program instructions, responsive to the determining of the match, to establish a contract for future consumption by the consumer computer of the matched on-demand computing resource.

2. The system as set forth in claim 1 further comprising:

at least one tier-based dynamic incentive schema stored in a computer-readable storage device, wherein the schema contains a plurality of tiers of bidder definitions, and contains an incentive resource to be allocated to a winning bidder; and program instructions, stored on the at least one of the one or more storage devices for execution by at least one of the one or more processors via at least one of the one or more memories, to evaluate one or more bids and the predicted free pool;

wherein the tiers comprise groups of bidders, each of the tiers having an incrementally lowering of reserve pricing relative the reserve pricing of a higher tier.

3. The system as set forth in claim 1 wherein the program instructions further comprise program instructions for monitoring on-demand computing resource availability from a producer over a period of time, and for updating a historical trend of available on-demand computing resources according to the monitored producer over the period of time.

4. The system as set forth in claim 1 wherein the program instructions further comprise program instructions for monitoring on-demand computing resource consumption by a consumer computer over a period of time, for updating a historical trend of on-demand computing resource consumption according to the monitored period of time, and for predicting receipt of bids for usage of free pool computing resources from the monitored consumer computer.

5. The system as set forth in claim 1 wherein the program instructions further comprise program instructions for notifying a plurality of consumer computers of a current highest bid value, and further for receiving bids responsive to the notification until an event is detected, the event being selected from the group consisting of a bid being accepted, and a bid reaching a predetermined level.

6. The system as set forth in claim 1 wherein the program instructions further comprise program instructions for notifying a plurality of consumer computers of a current highest bid, and further for updating the predicted free pool until the predicted free pool reaches a predetermined level.

7. The system as set forth in claim 1 wherein the program instructions further comprise program instructions for withdrawing on-demand computing resources from the predicted free pool under at least one predetermined condition selected from the group consisting of receiving a usage bid matching a reserve price, receiving a matching bid within a period of offering time, and receiving a matching bid from an authenticated consumer computer.

8. The system as set forth in claim 1 wherein the computer system comprises a plurality of producer trending agent computing systems, at least one of the producer trending agent computing systems being for receiving the predicted free pool and the bids, and being for communicating the bids, and predicted free pool to other producer trending agent computing systems.

9. The system as set forth in claim 1 wherein the computer system employs digital certificates to authenticate the predicted free pool.

10. The system as set forth in claim 9 wherein the digital certificates are employed to prevent repudiation of the established contract for consumption.

11. The system as set forth in claim 1 wherein the computer system employs digital certificates to authenticate the bid.

12. The system as set forth in claim 11 wherein the digital certificates are employed to prevent repudiation of the established contract for consumption.

13. A method for allocating available resources in an on-demand computing environment, the method comprising the steps of:
predicting by a computer system having a processor a future free pool of on-demand computing resources according to trend analysis of past available on-demand computing resources;
responsive to receiving by the computer system a bid for future usage of on-demand computing resources by a consumer computer, determining by the computer system that conditions specified in the bid match one of the on-demand computing resources within the predicted free pool; and
responsive to the determining of the match, establishing by the computer system a contract for future consumption by the consumer computer of the matched on-demand computing resource.

14. The method as set forth in claim 13 further comprising:
accessing by the computer system at least one tier-based dynamic incentive schema containing a plurality of tiers of bidder definitions, and containing an incentive resource to be allocated to a winning bidder; and
evaluating by the computer system one or more bids for usage and the predicted free pool;
wherein the tiers comprise groups of bidders, each of the tiers having an incrementally lowering of reserve pricing relative the reserve pricing of a higher tier.

15. The method as set forth in claim 13 further comprising:
monitoring by the computer system on-demand computing resource availability from a producer over a period of time; and
updating by the computer system the historical trend of available on-demand computing resources according to the monitored producer over the period of time.

16. The method as set forth in claim 13 further comprising:
monitoring by the computer system on-demand computing resource consumption by a consumer computer over a period of time;
updating a historical trend of on-demand computing resource consumption according to the monitored period of time; and
predicting by the computer receipt of bids for usage of free pool computing resources from the monitored consumer computer.

17. The method as set forth in claim 13 further comprising:
notifying by the computer system a plurality of consumer computers of a current highest bid value; and
receiving by the computer system bids responsive to the notification until an event is detected, the event being selected from the group consisting of a bid being accepted, and a bid reaching a predetermined level.

18. The method as set forth in claim 13 further comprising:
notifying by the computer system a plurality of consumer computers of a current highest bid; and
updating by the computer system the predicted free pool until the predicted free pool reaches a predetermined level.

19. The method as set forth in claim 13 further comprising withdrawing by the computer system on-demand computing resources from the predicted free pool under at least one predetermined condition selected from the group consisting of receiving a bit matching a reserve price, receiving a matching bid within a period of offering time, and receiving a matching bid from an authenticated consumer computer.

20. The method as set forth in claim 13 further comprising providing a plurality of producer trending agent computing systems to receive the predicted free pool and the bids, and to communicate the bids, predicted free pool to other producer trending agent computing systems.

21. The method as set forth in claim 13 further comprising employing a digital certificate to authenticate the predicted free pool.

22. The method as set forth in claim 21 wherein the digital certificates are employed to prevent repudiation of the established contract for consumption.

23. The method as set forth in claim 13 further comprising employing a digital certificate to authenticate the bid.

24. The method as set forth in claim 23 wherein the digital certificates are employed to prevent repudiation of the established contract for consumption.

25. A computer program product for allocating future available resources in an on-demand computing environment, the computer program product comprising:
first program code, stored on a computer-readable storage device, to predict by a computer system having a processor a future free pool of on-demand computing resources according to trend analysis of past available on-demand computing resources;
second program code, stored on a computer-readable storage device, responsive to receiving by the computer system a bid for future usage of on-demand computing resources by a consumer computer, to determine by the computer system that conditions specified in the bid match one of the on-demand computer resources within the free pool; and
third program code, stored on a computer-readable storage device, responsive to the determining of the match, to establish by the computer system a contract for future consumption by the consumer computer of the matched on-demand computing resource.

26. The computer program product as set forth in claim 25 further comprising:
fourth program code, stored on a computer-readable storage device, for accessing at least one tier-based dynamic incentive schema containing a plurality of tiers of bidder definitions, and containing an incentive resource to be allocated to a winning bidder; and
fifth program code, stored on a computer-readable storage device, for evaluating one or more bids, and the predicted free pool;

wherein the tiers comprise groups of bidders, each of the tiers having an incrementally lowering of reserve pricing relative the reserve pricing of a higher tier.

27. The computer program product as set forth in claim 25 further comprising:
   fourth program code, stored on a computer-readable storage device, for monitoring computing resource availability from a producer over a period of time; and
   fifth program code, stored on a computer-readable storage device, for updating the historical trend of available on-demand computing resources according to the monitored producer over the period of time.

28. The computer program product as set forth in claim 25 further comprising:
   fourth program code, stored on by a computer-readable storage device, for monitoring on-demand computing resource consumption by a consumer computer over a period of time;
   fifth program code, stored on a computer-readable storage device, for updating a historical trend of on-demand computing resource consumption according to the monitored period of time; and
   sixth program code, stored on a computer-readable storage device, for predicting receipt of bids for usage of free pool computing from the monitored consumer computer.

29. The computer program product as set forth in claim 25 further comprising:
   fourth program code, stored on a computer-readable storage device, for notifying a plurality of consumer computers of a current highest bid value; and
   fifth program code, stored on a computer-readable storage device, for receiving bids responsive to the notification until an event is detected, the event being selected from the group consisting of a bid being accepted, and a bid reaching a predetermined level.

30. The computer program product as set forth in claim 25 further comprising:
   fourth program code, stored on a computer-readable storage device, for notifying a plurality of consumer computers of a current highest bid value; and
   fifth program code, stored on a computer-readable storage device, for updating the predicted free pool until the predicted free pool reaches a predetermined level.

31. The computer program product as set forth in claim 25 further comprising fourth program code, stored on a computer-readable storage device, for withdrawing on-demand computing resources from the predicted free pool under at least one predetermined condition selected from the group consisting of receiving a bid matching a reserve price, receiving a matching bid within a period of offering time, and receiving a matching bid from an authenticated consumer computer.

32. The computer program product as set forth in claim 25 further comprising fourth program code, stored on a computer-readable storage device, for providing a plurality of producer trending agent computing systems for receiving the predicted free pool and the bids, and for communicating the bids and predicted free pool to other producer trending agent computing systems.

33. The computer program product as set forth in claim 25 further comprising fourth program code, stored on a computer-readable storage device, for employing a digital certificate to authenticate the predicted free pool.

34. The computer program product as set forth in claim 33 wherein the digital certificates are employed to prevent repudiation of the established contract for consumption.

35. The computer program product as set forth in claim 25 further comprising fourth program code, stored on a computer-readable storage device, for employing a digital certificate to authenticate the bid.

36. The computer program product as set forth in claim 35 wherein the digital certificates are employed to prevent repudiation of the established contract for consumption.

\* \* \* \* \*